Nov. 13, 1956     E. S. CHRISTENSEN     2,770,287
LEVEL RIDE SEAT
Filed Jan. 19, 1954     2 Sheets-Sheet 1
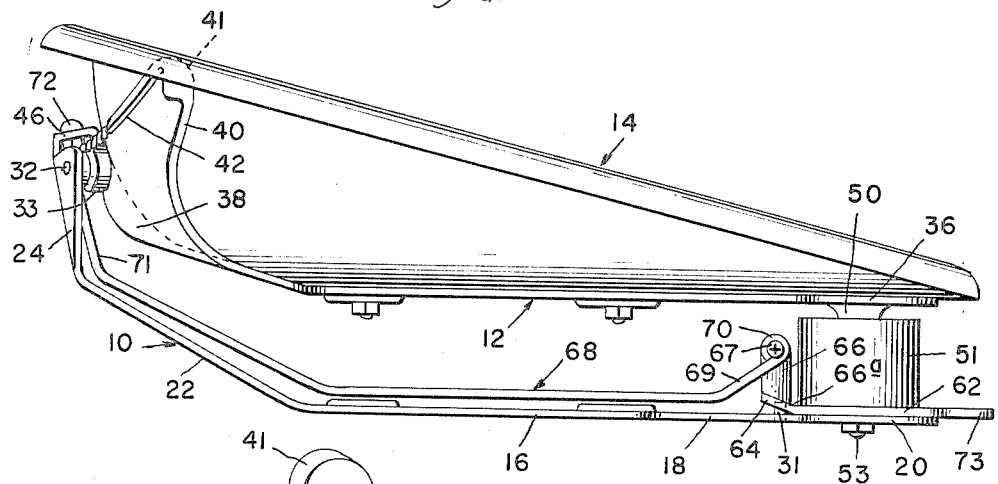
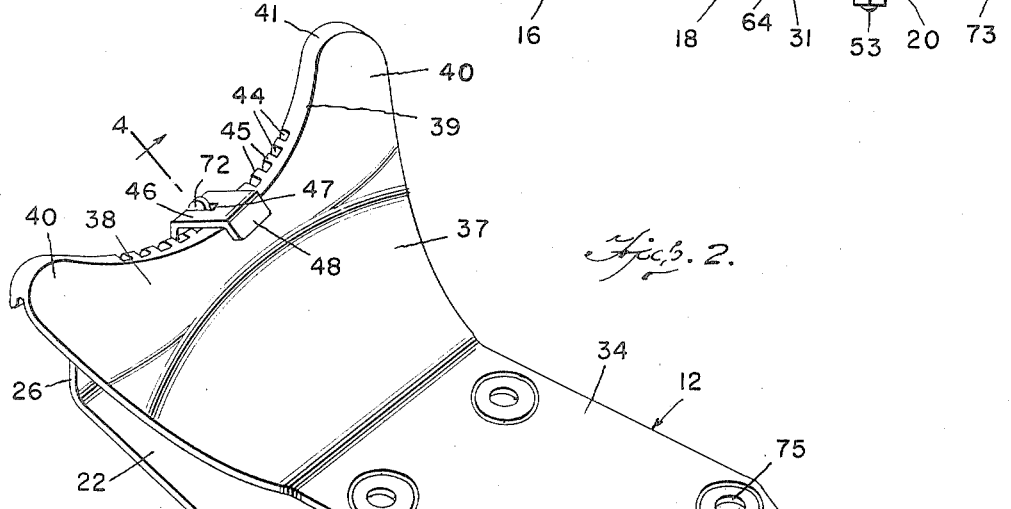
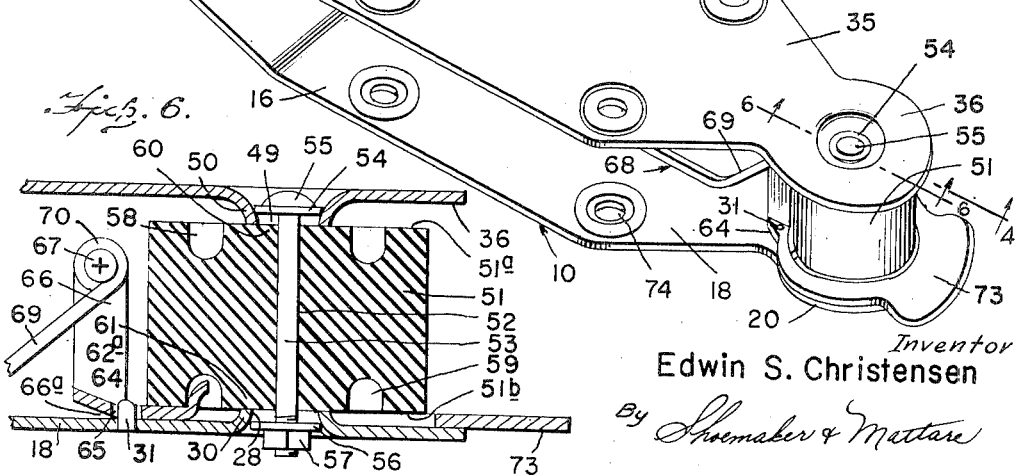
Inventor
Edwin S. Christensen
By Shoemaker & Mattare
ATTYS.

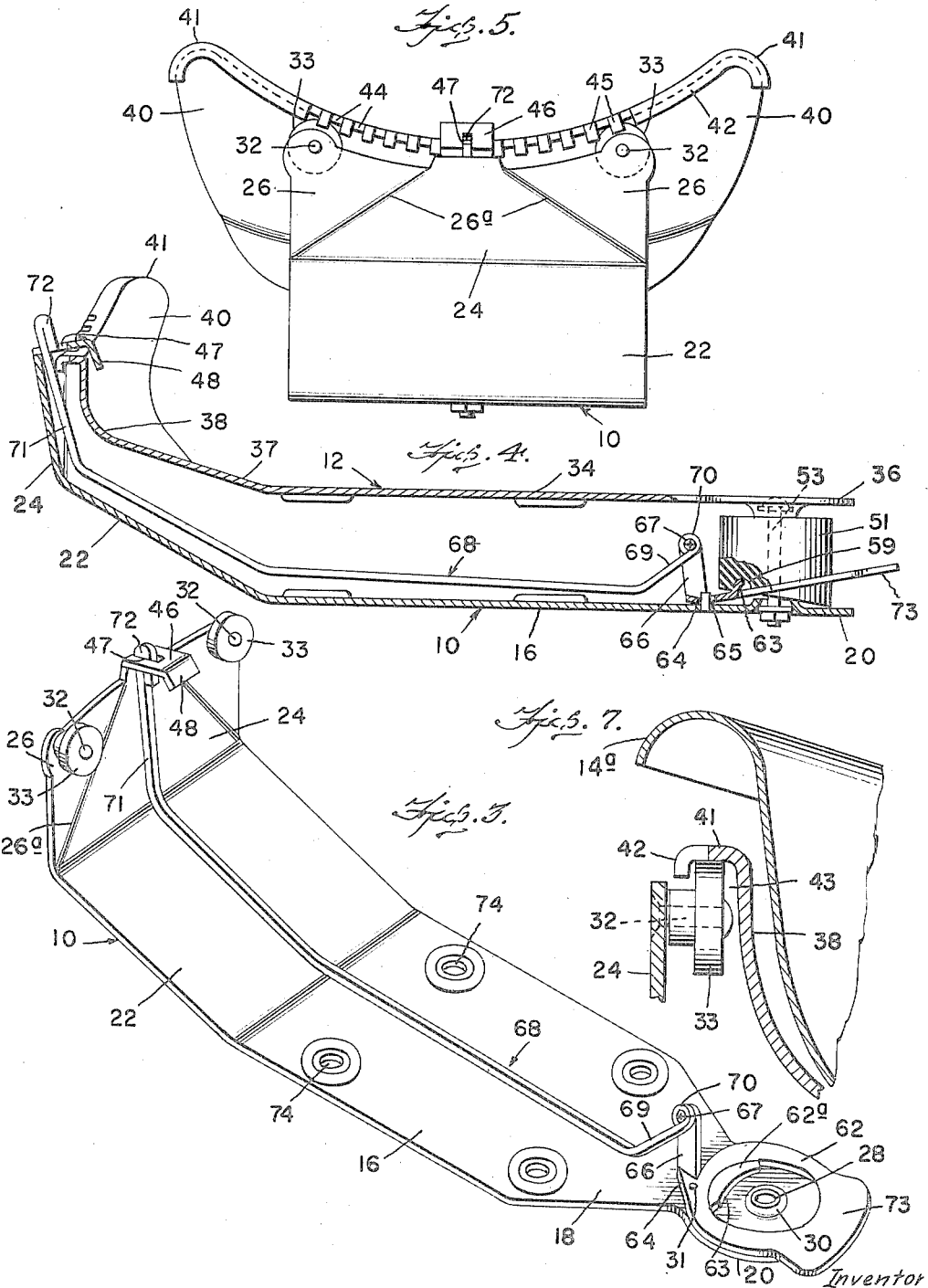

United States Patent Office 2,770,287
Patented Nov. 13, 1956

2,770,287

LEVEL RIDE SEAT

Edwin S. Christensen, Long Beach, Calif., assignor to Ernest F. Pohl, Woodside, N. Y.

Application January 19, 1954, Serial No. 404,935

18 Claims. (Cl. 155—9)

This invention relates generally to the class of chairs and seats and is directed particularly to improvements in level ride seats for use upon various types of vehicles such as tractors or the like which normally travel over rough, inclined or otherwise non-level surfaces.

In the operation of tractors and other vehicles of the character stated, a condition exists with relation to rider seats having a fixed or non-adjustable position on the vehicle, which seriously affects the comfort of the rider or operator of the vehicle. This condition or problem relates to the uncomfortableness of sitting on such a fixed or non-adjustable seat, while the vehicle is traveling over a surface inclined transversely relative to the vehicle. The operator of the vehicle tends to sit in or maintain an upright position at all times whereas the vehicle seat inclines or changes its position as the inclination of the vehicle and the underlying supporting surface changes so that the seat tends to hold the posterior of the operator in an inclined position which results in discomfort, muscle strain and general fatigue of the operator.

While structures have heretofore been devised with a view to overcoming the difficulties above stated, such structures have not been found entirely satisfactory for various reasons, as, for example, such prior structures are in many instances rather complex and are, therefore, expensive to manufacture or adjustments of the seat cannot be made easily and quickly by the operator while occupying the seat.

In the light of the foregoing, it is an object of the present invention to provide in a level ride seat, a new construction which is relatively simple and inexpensive to manufacture and which will adequately meet or overcome the undesirable or unsatisfactory conditions hereinbefore set forth.

Another object of the invention is to provide, in a level ride seat structure, a supporting means for the seat proper which is rockable about a fixed point so that the seat can be shifted as desired to compensate for changes in the inclination of the underlying supporting structure or in the ground over which the vehicle is traveling, to facilitate the maintenance of the seat and the posterior portion of the driver positioned thereon, in a constantly level position to enable the operator to sit upright at all times without strain.

Another object of the invention is to provide, in a level ride seat, a supporting cradle for the seat body, having a three point suspension and adapted to swing laterally with respect to underlying structure, about a fixed one of the suspension points, with a novel means for locking the cradle body in a position of adjustment to which it has been moved.

Still another object of the invention is to provide, in a level ride seat structure, a supporting cradle for the seat body, mounted in the manner above set forth and wherein the suspension means at the said one point about which the cradle swings or rocks, also functions as a snubber or absorber of shocks and jars incident to the operation of the vehicle upon which the seat is mounted.

A still further object of the invention is to provide, in a level ride seat construction, a novel locking means for maintaining the seat supporting cradle in a desired adjusted position together with novel means utilizing the resiliency of the snubber or shock absorber for actuating the locking means into seat locking position.

Broadly, the invention contemplates the provision of a bottom or base plate which is fixed in any suitable manner to a conventional support carried by the vehicle body, such as a post, a spring arm, or any of the other types of supporting means used for mounting a seat. This base plate has a forward end and an upwardly inclined or curving rear end portion and the latter portion carries two transversely spaced supporting rollers mounted to turn on axes which converge and intersect in the vertical longitudinal central plane of the base plate at its forward end.

At the said forward end of the base plate, the latter has secured thereto an upstanding resilient body through which passes a coupling bolt or pin.

Overlying the base plate is a cradle structure comprising an elongate body substantially conforming in shape to the base plate and having a forward end resting upon the top of said resilient body and transfixed by said pin whereby said forward end is loosely supported on the resilient body for oscillating and rocking movement. The back end of the cradle body extends upwardly at an inclination and is defined by a transverse concave arcuate flange or track channel which rests upon and is supported by the before-stated rollers. Said flange or channel is also provided at the rear of the cradle with a plurality of notches providing spaced teeth between which engages a reciprocable dog carried by the adjacent upturned end of the base and at the forward end of the base plate there is located a vertically oscillatable finger plate connected with the dog by a rigid actuating bar whereby upon oscillation of the finger plate, the dog will be shifted to either engage between a pair of teeth to secure the cradle against movement or disengage from the teeth to permit transverse rocking movement of the cradle. Means is also provided between the dog actuating means and the resilient support whereby said resilient support functions to constantly urge movement of the dog in a direction for engagetment between two of the locking teeth to hold the cradle against movement.

The invention will be best understood from a consideration of the following detailed description taken in connection with the accompanying drawings with the understanding that the invention is not confined to a strict conformity with the showing of the drawings but may be changed or modified within the scope of the appended claims.

In the drawings:

Fig. 1 is a view in side elevation of the invention showing a conventional seat body mounted thereon and supported in horizontal position.

Fig. 2 is a top perspective view of the seat supporting structure.

Fig. 3 is a top perspective view of the bottom or stationary unit of the seat supporting structure with the cradle removed.

Fig. 4 is a central longitudinal section through the seat supporting structure taken substantially on the line 4—4 of Fig. 2.

Fig. 5 is a back view of the structure.

Fig. 6 is a detail section taken in a vertical plane substantially on the line 6—6 of Fig. 2 and shown on an enlarged scale.

Fig. 7 is a detail section taken in a vertical plane through the top portion of the back of the seat supporting structure adjacent to a supporting roller and showing a portion of the back of a supported seat which is also in section.

Referring now more particularly to the drawings, the numeral 10 generally designates the fixed base portion of the present device by which a seat body is supported, while the numeral 12 generally designates a shiftable or rockable cradle unit to which the seat body is secured.

In Fig. 1 there is shown one type of seat body which may be mounted upon the cradle 12, this seat body being generally designated 14. It is to be understood, however, that the invention is not limited in any respect to the use of this type as it will be obvious that any form of seat body can be mounted in the supporting cradle.

The seat body 14 here illustrated is of a form in which there is a bordernig flange 14a which is slightly downturned and which, when applied to the cradle 12, covers a portion of the supporting mechanism in the manner hereinafter set forth.

As illustrated, the base plate 10 is of elongate form and comprises the central flat portion 16, of substantial width, which tapers at its forward end in the portion 18 and terminates in the circular or parti-circular end portion 20.

The rear end or part of the central portion 16 joins the upwardly and rearwardly inclined portion 22 which, in turn, merges with the substantially vertically upwardly extending rear portion or wall 24 which has the opposite or transversely spaced corner ears 26 for the support of the hereinafter described wheels or rollers. These corner ear portions are bent slightly on the lines 26a to stand forwardly from the central part of the wall 24 so that such corner ears assume a vertical position and also face inwardly slightly toward the longitudinal center of the base plate.

The front end portion 20 has formed through the center thereof the aperture 28 which is defined by the upturned flange 30 and fixed to the portion 18 of the plate on the longitudinal center thereof and behind the aperture 28 is an upstanding stud 31, the purpose of which will be hereinafter set forth.

Fixed to each of the ears 26 to project forwardly therefrom is a pivot pin or rivet 32 and, upon each of these pivot pins, or rivets 32, is mounted for free rotation, a roller or wheel 33.

While a number of different materials may be employed for the rollers 33, it is preferred that they be made of the synthetic resin material known as "nylon," since such material has self-lubricating qualities which are highly desirable in a construction such as the present one.

By facing the wings 26 inwardly slightly, the axes of the pivot pins 32 will converge and intersect in the central vertical longitudinal plane of the base plate 10 approximately on the center of the opening 28.

The seat supporting cradle body 12 also comprises, like the base plate 10, an elongate metal plate body having the central portion 34, the tapered forward end portion 35 which terminates in the part-circular forward end 36 which may be defined as the pivot or rocking head of the cradle.

At its rear end, the central portion 34 of the cradle joins the upwardly and rearwardly inclined back portion 37 which also widens or flares out and joins the upstanding back wall 38, the top edge of which is of concave arcuate contour as indicated at 39. The upwardly and outwardly widening character of the inclined wall 37, together with the concave curvature of the top edge 39 of the substantially vertical back wall 38 forms at opposite sides of the back of the cradle the upwardly and outwardly directed wings 40.

Bordering the concave top edge 39 of the wall 38 and the wings 40 and extending rearwardly is a relatively wide flange 41 which is, in turn, bordered at its back edge by the short downwardly directed flange 42. Thus there is formed a downwardly opening channel 43 which forms a trackway for the rollers 33.

Formed through the flanges 41 and 42 are the rearwardly opening slots 44 which form the spaced teeth 45 for the purpose hereinafter set forth.

Fixed to the top edge of the back wall 24 of the base plate, midway between the rollers 23 is a short forwardly extending keeper plate 46 in which is formed a guide slot 47. This plate 46 is disposed at an elevation to extend across the horizontal flange 41 and at the forward edge of the keeper plate is a downturned lip 48 which, when the parts are assembled, overlies the forward face of the cradle wall 38 as illustrated in Fig. 5.

At the forward end of the cradle, the rocking head 36 is provided with the opening 49 which is defined by the downwardly extending pressed flange 50. This opening 49 is concentric with the opening 28 in the underlying part 20 of the base plate.

Interposed between the base plate part 20 and the head 36 is a spacer block or cylinder 51. This cylinder is formed of solid rubber and has extending axially therethrough the bolt passage 52 which is coaxial with the openings 28 and 49 and through this passage extends coupling bolt 53 which also passes at its upper end through a ring or washer 54 which rests in the tapered flange 50 of the cradle plate as illustrated in Fig. 6. The head 55 of the bolt 53 bears upon the top of the washer or collar 54 while the opposite end of the bolt passes through a corresponding washer or collar 56 which bears at its periphery against the wall of the upwardly tapering flange 30 which defines the lower opening 28 and threaded on the lower end of the bolt and bearing against the under side of this collar is a securing nut 57.

The flat top and bottom surfaces 51a and 51b respectively of the rubber block or cylinder 51 have formed therein the annular channels 58 and 59 thus forming central axially directed top and bottom bearing studs 60 and 61 respectively. The upwardly extending flange 30 has the lower bearing stud 61 resting thereon while the edge of the downwardly directed flange 50 surrounding the opening 49 of the cradle plate has rocking bearing engagement upon the top of the upper stud 60 as shown in Fig. 6.

The spacer block or cylinder 51 provides a forward central suspension for the cradle 12 which lies on the longitudinal center of the cradle and the rollers 33 provide lateral rear suspension points which are spaced from or lie at opposite sides of the vertical central longitudinal plane of the cradle. Thus there is provided a three point suspension means for the cradle which permits the latter to swing laterally with respect to the central pivot bolt 53, the downwardly bowed under face of the flange 41 riding upon the tops of the rollers 33 during this lateral swinging movement. When such lateral swinging of the cradle is effected, it will be seen that the cradle will assume a transversely inclined position at the same time that it swings laterally or transversely of the base plate 10 and it will have a slight turning action with respect to the pivot bolt. This swinging and turning action will cause the annular downturned or downwardly directed flange 50 to rock on the bearing stud 60 and press downwardly thereagainst. Since the head end 36 of the cradle plate cannot rise due to the holding action of the bolt 53, one edge or one side of the flange 50 will be forced downwardly against the resisting rubber bearing stud 60. Consequently, at all times except when the cradle is in its central or horizontally disposed position, the rubber stud 60 will maintain a constant upright thrust against one side of the flange 50 tending to urge the return of the cradle plate to its horizontal or normal position.

For the purpose of securing the cradle body 12 in either its normal horizontal position or a position of lateral adjustment, the following latching mechanism, cooperating with the teeth 45 and operable from the front of the seat, is provided.

Resting upon the top of the forward end portion 20 of the base plate is a flat ring 62, the major portion of the opening therein being of a diameter slightly greater than the diameter of the rubber cylinder 51. This ring 62 is interposed between the bottom of the rubber post 51 and the forward portion 20 of the base plate, in concentric relation with the post 51 and in the rear part of the ring an inwardly extending flange portion 62a is provided which lies beneath the rear part of the rubber cylinder 51 and the edge of this flange portion is defined by the upturned lip 63 which, as shown, in Fig. 6, extends into the annular channel 61. Thus the rubber block or cylinder 51 is supported upon the flange portion 62 of the ring as shown.

Extending rearwardly from the ring 62 is an upwardly curved rocker finger 64 which is provided with an elliptical opening 65 in which is engaged the stud 31.

Carried by the rocker finger 64 is an upstanding post 66 which carries at its upper end the transversely directed bearing screw or pin 67.

The numeral 68 generally designates a bar which extends longitudinally of the base plate 10 and has at its forward end an upturned portion 69 provided with an eye 70 through which the bearing screw or pin 67 passes to couple this end of the bar with the upper end of post 66.

The rear end of the bar 68 has the upwardly and rearwardly inclined portion 71 which extends through the slot 47 of the keeper plate 46. The top end of this portion 71 carries a dog 72 which is adapted for engagement in a selected one of the slot 44 to secure the cradle 12 against rocking movement. While this dog 72 may be formed in any manner, it is here shown as consisting of a portion of the end of the bar turned back upon itself so that the dog, formed by this turned back portion, lies against the forward face of the upwardly extending part 71 of the bar.

The base plate 10 may be secured in any suitable manner to the selected support and it is here shown as having the four bolt openings 74 for this purpose. Likewise, the cradle is provided with bolt openings 75 to facilitate the attachment thereto of the seat body 14. It will be understood, however, that any other suitable means may be employed for securing the base plate 10 to its supporting body and also other means may be made use of for securing the cradle 12 to the seat body.

It will be seen upon reference to Fig. 1 that when the seat body 14 is mounted upon the cradle, the flanged portion 14a thereof, at the back, will cover the notched channel flanges 41 and 42 which form a rack between the teeth of which the locking dog 72 is adapted to engage, so that in the movements of the seat body and cradle, the clothing of the occupant of the seat will not become entangled between the rack and the supporting rollers 33.

In the use of the present invention, when the person occupying the seat 14 desires to level the seat following the movement of the underlying base plate to an inclined position, the forwardly extending ear 73, which forms an integral part of the ring 62 of the dog actuating mechanism, is grasped and pulled upwardly so as to effect the rocking of the ring about the pivot formed at the angle 66a between the rear part of the ring 62 and the rocket 64. This action lifts the part 62a and the flange lip 63 against the downward pressure of the rubber block or cylinder 51, it being understood that the forward and side portions of the ring 62 swing upwardly in partial surrounding relation with the cylinder. This rocking action effects the rearward swinging of the post 66 and shifts the rod 68 longitudinally to elevate the dog 72 thereby disengaging it from between two adjacent teeth 45. The cradle 12 and seat body are now free to be shifted and this shifting action is effected by the occupant of the seat who shifts or throws his weight laterally in the proper direction to effect the rocking of the seat. After the seat and cradle have been shifted to the desired position, the tongue 73 is released and the downward pressure upon the cylinder or block 51 effects the reverse rocking of the ring, so that the rod 68 is shifted forwardly and the dog 72 is lowered between a pair of teeth 45 to secure the cradle.

In addition to the function of the rubber block or cylinder to provide a yielding resistance to the rocking action of the cradle so as to facilitate the return movement of the cradle to normal horizontal position with respect to the underlying base plate 10, and to also provide a force to reversely rock the ring 62 when the tongue 73 is released to drop back to its position upon the top of the base plate, such block functions as a buffer or shock absorber between the front part of the seat cradle and the underlying fixed plate body which is joined to the supporting post of other support forming a part of the vehicle structure.

From the foregoing, it will be seen that there is provided by the present invention a relatively simple construction, employing few moving parts, whereby the desired objects of the invention are attained. In this construction, the occupant of the seat can, by the use of one hand, effect the desired release of the cradle so that by shifting his body in the manner previously stated, the cradle can be leveled as desired and immediately locked in position by the release of the dog actuating element. Consequently, the driver can obtain the desired leveling of the seat without taking his attention from the job of operating the vehicle and without releasing the vehicle steering wheel or other control part thereof while making the desired seat adjustment since, as is clearly obvious, the use of both hands to facilitate adjusting the seat is not necessary.

I claim:

1. In a level ride seat construction two superposed members, the lower member being designed to be secured to a support, the upper member being adapted to carry a sitter, and means providing a three point suspension of the upper member on the lower member, said suspension points being in substantially triangular arrangement with the apex of such triangle at the front of the seat, the apex point suspension being a fixed yielding and resilient pivot means, and the two remaining points of suspension comprising spaced rollers, whereby the rear of the upper member may swing upwardly and laterally in either direction with respect to the lower member.

2. The invention according to claim 1, wherein the said apex point suspension includes a yielding shock absorbing element supported on the lower member and carrying the weight of the upper member.

3. The invention according to claim 1, wherein the said two remaining points comprise a pair of stationary rotatable roller elements carried on one of the members and a track forming means carried by the other member and having the rotatable elements in rolling engagement therewith.

4. The invention according to claim 1, with means for latching the members together to secure the upper member against movement relative to the lower member.

5. The invention according to claim 2, wherein said yielding shock absorbing element comprises a body of rubber.

6. In a level ride seat construction, two superposed members, the lower member being designed to be secured to a support, the upper member being provided to carry a sitter, a front suspension means for the upper member supported on the lower member, rear means for suspending the upper member upon the lower member at points spaced transversely of the members, said front suspension means comprising a loose yielding and resilient coupling means, permitting simultaneous rocking and pivoted motion of the front of the upper member relative to the lower member, said rear means comprising rotatable elements carried by one member and an arcuate trackway on the other member bearing against said elements and carried by and extending transversely of the other member whereby transverse swinging movement of the rear of the upper member in a down curving arc is permitted.

7. The invention according to claim 6, wherein the front suspension means comprises an upstanding resilient body having a bearing between its top and bottom parts and the top and bottom members respectively and a coupling bolt passing through the resilient body and loosely connected at its ends with the top and bottom members.

8. The invention according to claim 7, wherein the upper and lower members comprise rigid plates, each member having an aperture through which the bolt passes, and an annular flange encircling the aperture and forming the bearing with the opposing part of the resilient body.

9. The invention according to claim 7, wherein said rotatable elements comprise rollers supported for rotation on axes converging toward the front suspension means and said arcuate trackway comprises a rearwardly projecting flange having a surface in riding engagement with the peripheries of the rollers.

10. The invention according to claim 6, with a rack and shiftable dog locking means between the rear ends of said members and means operable from the front of the construction for effecting movement of the dog relative to the rack.

11. The invention according to claim 10, with resilient means urging movement of the dog into rack engaging position.

12. The invention according to claim 10, wherein the front suspension means comprises an upstanding resilient body having a bearing between its top and bottom parts and the top and bottom members respectively, a coupling bolt passing through the resilient body and loosely connected at its ends with the top and bottom members, a rack and shiftable dog locking means between the members, means for shifting the dog out of engagement with the rack, and means whereby said resilient body operates to oppose said shifting of the dog and urges the dog from a disengaged to an engaged position with the rack.

13. In a level ride seat construction, an elongate bottom plate having an upstanding back end wall portion and a front end, an overlying elongate cradle plate having an upstanding back end wall portion in front of the first named wall and having a front end overlying the first named front end, an upstanding body of resilient material interposed between and spacing said front ends, means securing the cradle plate front end to the top of said body constructed and arranged to permit simultaneous rocking and turning movements of the cradle plate, a pair of rotatable elements carried by one of said back end wall portions horizontally spaced transversely of the plates, and a downwardly bowed flange carried by the other one of said back end wall portions forming a track in engagement with said rotatable elements whereby the cradle plate may be swung at the back end transversely of the bottom plate in a downwardly bowed arc.

14. The invention according to claim 13, with releasable means carried by the bottom plate for engaging and securing the cradle plate.

15. The invention according to claim 13, with a toothed rack carried by and extending transversely of one plate, a shiftable securing dog carried by the other plate for engagement with the rack, and means for shifting the dog.

16. The invention according to claim 13, with a toothed rack carried by and extending lengthwise of said flange, a dog engageable with said rack, an actuating rod extending lengthwise of the bottom plate and having an upturned back end carrying said dog, and means carried upon the front end of the bottom plate and connected with said rod for shifting the rod to effect desired movement of the dog.

17. The invention according to claim 16, wherein said last means includes a rocker element having one portion secured between said body of resilient material and the bottom plate and another portion projecting upwardly and rearwardly, an upstanding post carried by the said another portion and having said rod, and means for oscillating the rocker element.

18. In a level ride seat construction, a seat body support comprising a base member having a front part and an upstanding back part, a cradle member overlying the base member and adapted to support a seat body, an upstanding spacing member interposed between the front part of the base and the overlying cradle, means forming a rocking connection between the cradle and said spacing member, means forming a free moving connection between the upstanding back part of the base member and the adjacent part of the cradle member which is so constructed and arranged that the cradle may swing transversely of the base member and rock at said connection forming means, and means for releasably securing the cradle against movement.

References Cited in the file of this patent

UNITED STATES PATENTS

| | | |
|---|---|---|
| 224,905 | Hedges et al. | Feb. 24, 1880 |
| 383,868 | Davey | June 5, 1888 |
| 918,249 | Young | Apr. 13, 1909 |
| 2,284,352 | Zank | May 26, 1942 |
| 2,649,136 | Eames | Aug. 18, 1953 |